United States Patent
Reis et al.

(10) Patent No.: US 10,823,822 B2
(45) Date of Patent: Nov. 3, 2020

(54) SYSTEM AND METHOD FOR DEPLOYING SELF-COORDINATED DEVICES IN AN ENVIRONMENT WITH INCUMBENT RECEIVERS

(71) Applicant: HIGHER GROUND LLC, Palo Alto, CA (US)

(72) Inventors: Robert Reis, Palo Alto, CA (US); Shmuel Shaffer, Palo Alto, CA (US)

(73) Assignee: HIGHER GROUND LLC, Palo Alto, CA (US)

( * ) Notice: Subject to any disclaimer, the term of this patent is extended or adjusted under 35 U.S.C. 154(b) by 245 days.

(21) Appl. No.: 15/722,330

(22) Filed: Oct. 2, 2017

(65) Prior Publication Data

US 2019/0101620 A1   Apr. 4, 2019

(51) Int. Cl.
| | |
|---|---|
| *G01S 7/40* | (2006.01) |
| *G01S 13/06* | (2006.01) |
| *G01S 3/00* | (2006.01) |
| *G01S 19/42* | (2010.01) |
| *G01S 19/14* | (2010.01) |
| *G01S 5/02* | (2010.01) |

(52) U.S. Cl.
CPC .............. *G01S 7/4008* (2013.01); *G01S 3/00* (2013.01); *G01S 13/06* (2013.01); *G01S 19/42* (2013.01); *G01S 5/0205* (2013.01); *G01S 19/14* (2013.01); *G01S 2007/4013* (2013.01)

(58) Field of Classification Search
CPC ........ G01S 7/4008; G01S 19/42; G01S 13/06; G01S 3/00; G01S 19/14; G01S 5/0205; G01S 2007/4013

USPC .......................................................... 342/82
See application file for complete search history.

(56) References Cited

U.S. PATENT DOCUMENTS

| | | | |
|---|---|---|---|
| 9,713,019 B2 | 7/2017 | Negus et al. | |
| 2008/0062891 A1* | 3/2008 | Van der Merwe | ...... H04L 45/04 370/254 |
| 2012/0100854 A1* | 4/2012 | Hanaoka | ........... H04W 72/0453 455/436 |
| 2013/0194950 A1* | 8/2013 | Haghighat | ............ H04W 24/02 370/252 |
| 2017/0171762 A1 | 6/2017 | Reis et al. | |
| 2017/0171868 A1* | 6/2017 | Reis | ...................... H04W 16/28 |
| 2017/0188372 A1 | 6/2017 | Reis et al. | |
| 2017/0188377 A1 | 6/2017 | Reis et al. | |
| 2017/0202014 A1 | 7/2017 | Moon et al. | |
| 2019/0101620 A1* | 4/2019 | Reis | ......................... G01S 3/00 |

OTHER PUBLICATIONS

U.S. Appl. No. 15/722,348, filed Oct. 2, 2017, Reis et al.
Notice of Allowance for U.S. Appl. No. 15/722,348, dated Nov. 6, 2019.

* cited by examiner

*Primary Examiner* — Bo Fan
(74) *Attorney, Agent, or Firm* — Jason H. Vick; Sheridan Ross, PC

(57) ABSTRACT

A system in accordance with one aspect mitigates interference with PtPRs (Point to Point Receivers) that may be caused by a Wi-Fi base station or terminal devices associated with the Wi-Fi base station.

12 Claims, 10 Drawing Sheets

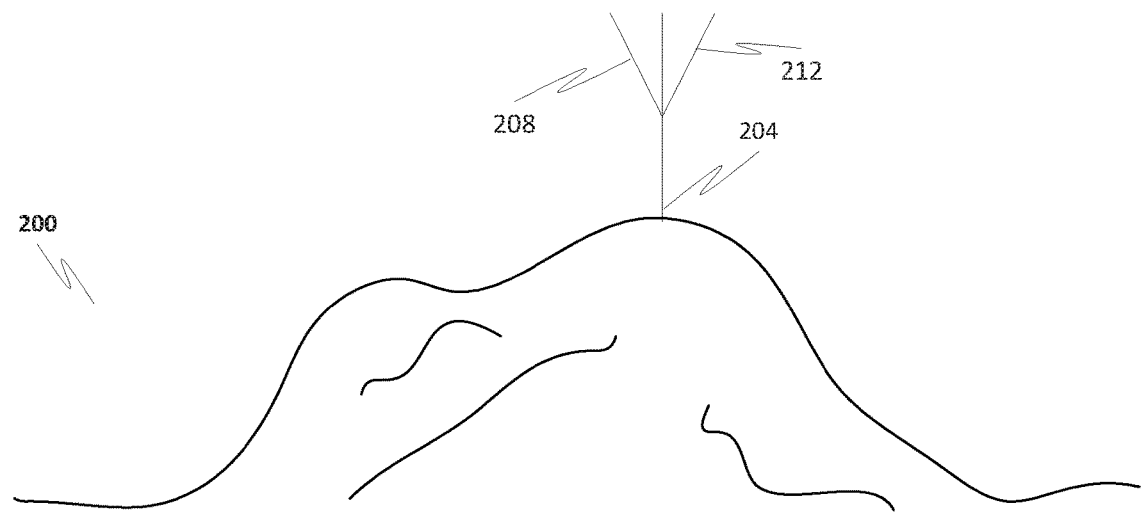
Fig. 2

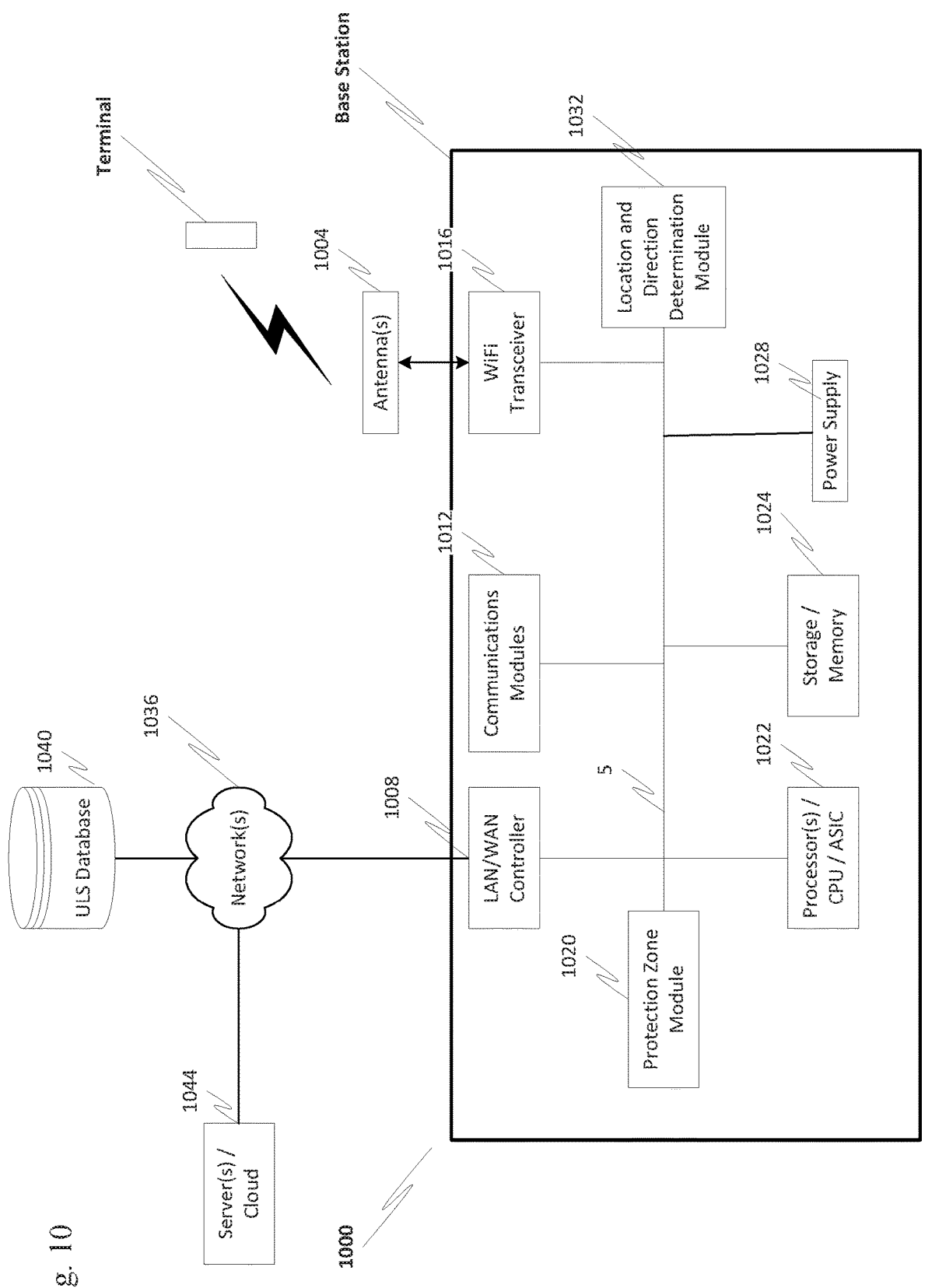

SYSTEM AND METHOD FOR DEPLOYING SELF-COORDINATED DEVICES IN AN ENVIRONMENT WITH INCUMBENT RECEIVERS

TECHNICAL FIELD

An exemplary aspect is directed toward communications systems. More specifically, an exemplary aspect is directed toward wireless communications systems and even more specifically to wireless networks and/or communications networks. Even more particularly, an exemplary aspect is directed toward wireless networks and protection zones for one or more of a plurality of unintended receivers.

BACKGROUND

Wi-Fi was first deployed in an unlicensed frequency band which was used for Industrial, Scientific and Medical (ISM) equipment. The ISM frequency band spans from 2.4 to 2.5 GHz and is referred to as the 2.4 GHz band. There are 14 channels defined for use by Wi-Fi IEEE 802.11 for the 2.4 GHz ISM band. Not all of the channels are allowed in all countries: 11 are allowed by the FCC (Federal Communication Commission) and used in what is often termed the North American domain, and 13 are allowed in Europe where channels have been defined by ETSI (European Telecommunications Standards Institute). The WLAN/Wi-Fi channels are spaced 5 MHz apart (with the exception of a 12 MHz spacing between the last two channels).

The IEEE 802.11 WLAN standards specify a bandwidth of 22 MHz and channels are on a 5 MHz incremental step. Nominal figures for the channel bandwidth of 20 MHz are often given. The 20/22 MHz bandwidth and channel separation of 5 MHz means that adjacent channels overlap and signals on adjacent channels will interfere with each other.

As the 2.4 GHz band becomes more crowded, many users are opting to use the 5 GHz ISM band. This not only provides additional spectrum, but it is not as widely used by appliances including items such as microwave ovens, etc.

The 5 GHz Wi-Fi bandwidth includes unlicensed ISM channels as well as numerous channels that fall outside the accepted ISM unlicensed band and, as a result, various restrictions are placed on operation at these frequencies. The main concern for using channels that fall outside the ISM unlicensed band is that the Wi-Fi equipment may interfere with operations of weather-radar and military applications (such as military radar and/or communications). To prevent interference, Wi-Fi equipment that operates in these frequencies must implement Dynamic Frequency Selection (DFS) and Transmit Power Control (TPC) capabilities on these channels.

DFS is a spectrum-sharing mechanism that allows wireless LANs (WLANs) to coexist with radar and other systems. A DFS system listens on a specific band for signal from, e.g., a radar system. If the DFS system detects a signal, the DFS system automatically selects a different frequency and examines the different frequency to see if there is any other equipment operating on it. The DFS system then selects and uses a 5 GHz frequency channel that does not interfere with any radar system.

DFS rules only apply to the frequency band between 5.250 and 5.725 GHz, which is the frequency band used by weather and military radars. It should be noted that DFS based systems are effective only when the incumbent system includes a transmitter that operates over the same frequency channel and as such announces the existence of a receiver on that frequency channel.

TPS is an automatic protocol by which two devices initiating communication in the 5 GHz spectrum will negotiate so that their respective power level is as low as possible, just high enough to hear each other. This arrangement reduces signal pollution and thus reduces interference with other devices. It should be noted that systems that utilize TPS may initially interfere with other systems, and may mitigate this interference only after the two communicating endpoints negotiate and reduce the transmission power.

U.S. patent application Ser. No. 15/379,131, entitled "Computing Protection Zones For Avoidance Of Interference In Wireless Communications," which is incorporated herein by reference in its entirety, describes a method for calculating (by a channel master) protection zones and causing the terminal to determine whether to perform or prevent an attempted transmission to an intended receiver.

U.S. patent application Ser. No. 15/455,687, entitled "Server Participation In Avoidance Of Interference In Wireless Communications," which is incorporated herein by reference in its entirety, assumes that an initial communication between a mobile terminal and a satellite has been established. The patent applicant describes methods by which the channel master (based on information it has and the client does not have) can instruct the client to change its transmission parameters in order to optimize the network.

U.S. patent application Ser. No. 15/455,775, entitled "Reduced Power For Avoidance Of Interference In Wireless Communications," which is incorporated herein by reference in its entirety, assumes that the terminal and the satellite were able to establish a non-interfering communication channel. Over this communication channel, the channel master should be able to broaden the communication choices (satellites and channels) that the terminal can use, effectively reducing the size of the protection zones that govern the operations of that terminal.

In all of these patent disclosures, the ground station communicates with terminals via a satellite using a directional antenna pointing towards the satellite. The channel used by the ground station for the forward path and the channels used by the satellite to transmit both on the forward and backward channels are licensed from and registered with the FCC. This ensures that none of these transmissions interfere with Point-to-Point Receivers (PtPRs).

SUMMARY

In contrast, an exemplary embodiment in accordance with one aspect mitigates interference with PtPRs that may be caused by a Wi-Fi base station or terminal devices associated with the Wi-Fi base station.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a simplified Point-to-Point (PtP) communications network in accordance with some embodiments;

FIG. 10 illustrates an exemplary base station architecture in accordance with some embodiments.

DESCRIPTION OF EMBODIMENTS

A communication network is a distributed collection of nodes (e.g., transmitters, receivers, transceivers, etc.) interconnected by communication links and segments for transporting signals or data between the nodes, such as telephony, TV/video, personal computers, workstations, mobile devices, servers, routers, base stations, satellites, and/or other devices. Many types of communication networks are available, including, but not limited to, computer networks (e.g., local area networks, wide area networks, and so on), communication networks (e.g., cellular networks, broadband networks, etc.), infrastructure or backhaul networks (e.g., C-Band/microwave inter-tower or "point-to-point" (PtP) networks, etc.), and many others.

Figure 1:
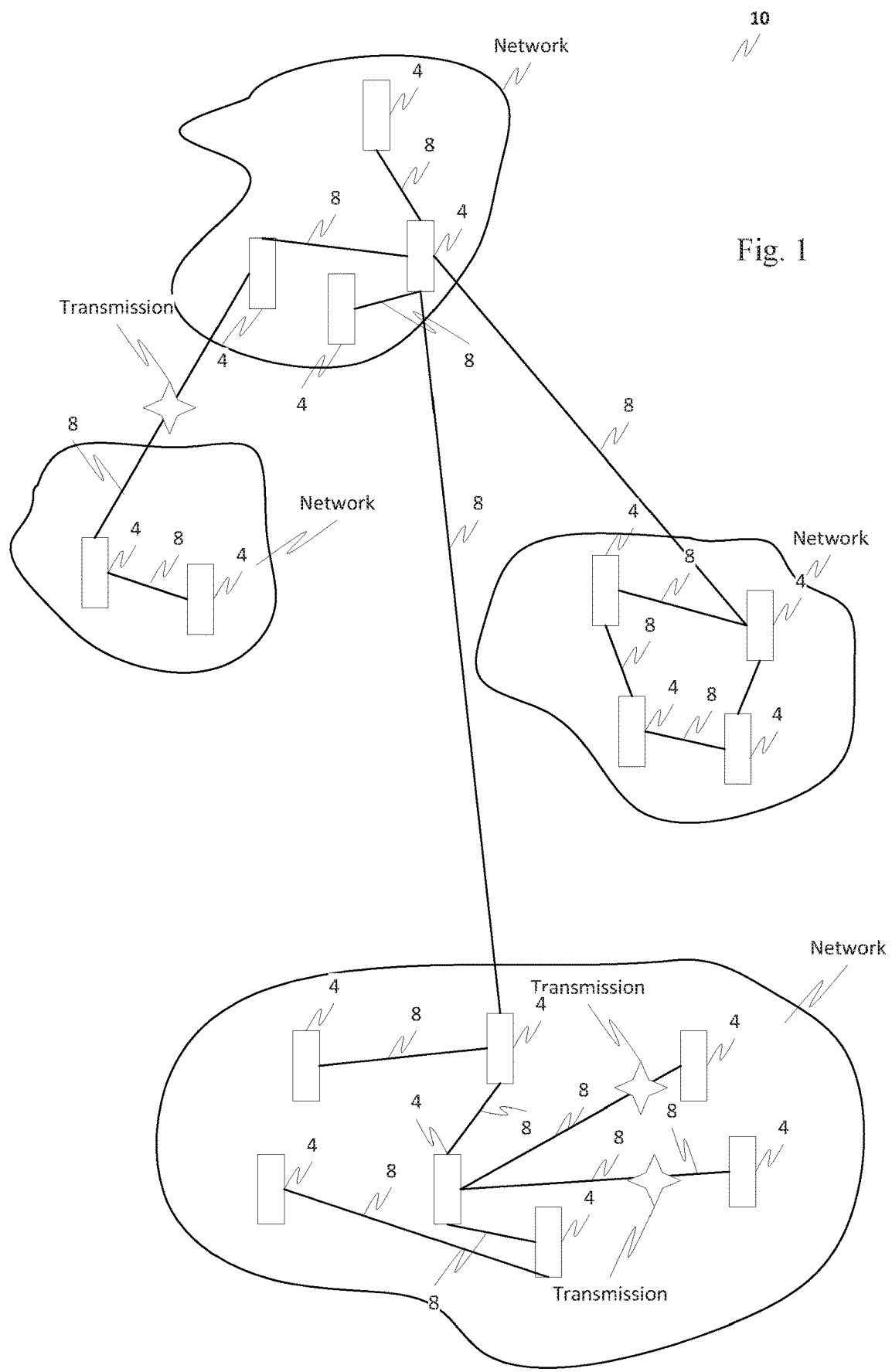
FIG. 1 illustrates an exemplary simplified communications environment in accordance with some embodiments.

FIG. 1 illustrates a simplified example of a communication network 10. As shown, one or more individual networks may contain various devices 4 communicating over links 8 specific to a particular network, or between one or more networks. As will be appreciated, the networks may include, but are not limited to, local area networks (LANs), wireless LANs, wide area networks (WANs), the Internet, cellular networks, infrared networks, microwave networks, satellite networks, and/or any other form or combination of data network configured to convey data and/or information between communicating devices. The networks may include any number of wired or wireless links between devices, though, as noted herein, the interference techniques are generally concerned only with wireless (or other shared media) links. Example wireless links therefore, may specifically include, but are not limited to, radio transmission links, near-field-based links, Wi-Fi links, satellite links, cellular links, infrared links, microwave links, optical (light/laser-based) links, combinations thereof, or the like.

Data transmissions (e.g., packets, frames, messages, transmission signals, voice/video/TV/radio signals, etc.) may be exchanged among the nodes/devices of the network(s) using predefined communication protocols where appropriate, and such communication may notably be bidirectional or unidirectional. In this context, a protocol includes a set of rules defining how the nodes interact with each other.

The devices 4 may be any form of electronic device operable to communicate via the one or more networks. For example, the devices 4 may be a desktop computer, a laptop computer, a tablet device, a phone, a smartphone, a wearable electronic device (e.g., a smart watch), a smart television, a set-top device for a television, a specifically designed communication terminal, a satellite phone, a workstation, a sensor/actuator, a vehicle, a drone, an unmanned vehicle, sensor(s), an unmanned aerial vehicle (UAV), other IoT devices, or the like.

In one illustrative embodiment, a communication device/terminal 4 may be configured to communicate via satellites (e.g., in the C-band, K-Band, or otherwise) within a satellite communication network/environment. (Note that when in the presence of the incumbent unintended receivers, such as point-to-point receivers, (PtPRs), mechanisms may be defined to prevent interference with the operations of the incumbent system, such as, for example, as described in commonly-owned, co-pending U.S. patent application Ser. No. 15/379,023 entitled "AVOIDANCE OF INTERFERENCE IN WIRELESS COMMUNICATIONS", filed by Reis et al. on Dec. 14, 2016, the contents of which are hereby incorporated by reference in their entirety. For instance, a network of terminals may communicate with Wi-Fi base stations to provide communication functionality such as, e.g., consumer-based text messaging/email, voice communication, picture/video communication, and Internet of Things ("IoT") communications.

The "Avoidance of Interference in Wireless Communications" disclosure at least describes a method by which a server may calculate protection zones and convey them to a terminal via a wired or wireless radio channel. The terminal then uses this compressed information to determine which frequency channels it may use without interfering with any incumbent PtPR.

Historically, the ground station communicates with terminals via a satellite using a directional antenna pointing towards the satellite. The channel used by the ground station for the forward path and the channels used by the satellite to transmit both on the forward and backward channels are licensed from and registered with the FCC (Federal Communications Commission). This ensures that none of these transmissions interfere with PtPRs.

In contrast, the system in accordance with one exemplary embodiment mitigates interference with PtPRs that may be caused by a Wi-Fi base station or terminal devices associated with the Wi-Fi base station.

FIG. 2 illustrates a simplified example of point to point (PtP) communication network 200. Transmitter tower 204 has two transmission antennas 208 and 212 pointed at PtPRs 216 and 220, respectively. (The transmission tower may also include receivers (and/or other transmitters or antennas) which are omitted from the figure for clarity.) In one exemplary embodiment, the receivers 216 and 220 may operate in C-band, however this frequency band is only an example and should not be construed to limit the scope of the disclosed technology. A point to point communication system, such as communications network 200, may utilize directional antennas for both the transmitter and the receiver. To ensure interference free communications, operators of the PtP communication system (in the United States) must license and register the frequency channel(s) in which the system operates with the FCC (or with similar authorities in other countries).

Specifically, in the United States, point-to-point microwave transmitters and receivers, such as 208-220, operate over radio frequencies that are licensed from and registered with the United States Federal Communications Commission (FCC). The registration records are kept in a ULS database, which includes details of geo-coordinates (location), antenna types and direction, frequency bands used within the C-band, polarizations, power, etc. Currently, in the US, there are approximately 56,000 PtPRs in the C-band frequency range, all of which are operating within FCC regulations.

The ULS database may be updated daily to reflect any changes such as introduction of a new PtP transmitter or receiver, as well as licensing of a new frequency channel by any of the existing or new transmitters or receivers.

The current method of licensing frequency channels for use in a specific location may be suitable for large systems such as the PtP transmitters and corresponding receivers. However, this method may be too slow and prohibitively expensive for use by small commercial outdoor Wi-Fi equipment providers or services.

What is needed is a system that provides a self-coordinated registration method which ensures that new (commercial) outdoor Wi-Fi equipment will not interfere with any PtPRs.

Figure 3:
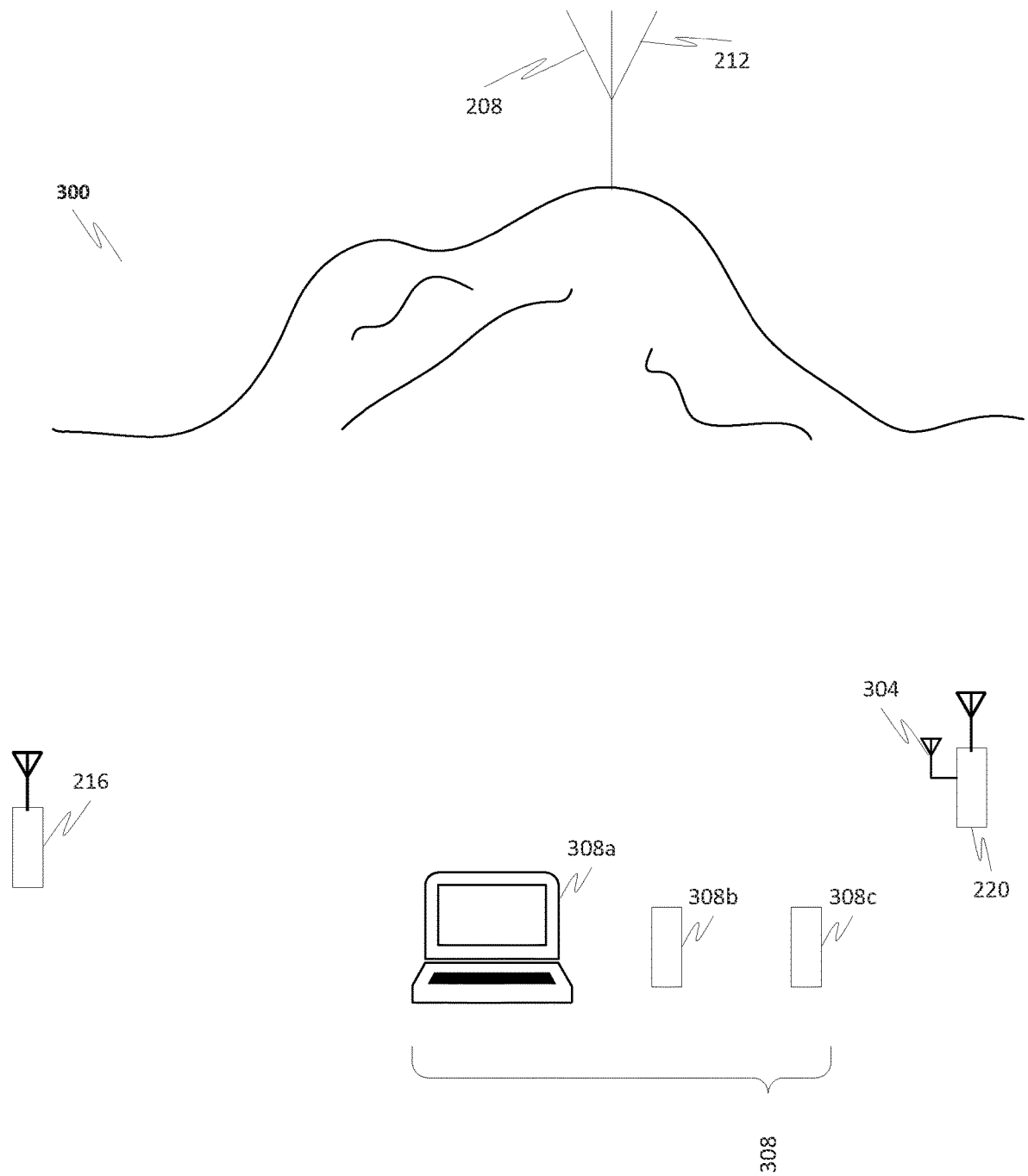
FIG. 3 illustrates an outdoor Wi-Fi communication system that includes a base station and devices/terminals which may operate in the same frequency channel as the incumbent PtP communication system illustrated in FIG. 2 in accordance with some embodiments.

Referring to FIG. 3, an outdoor Wi-Fi communication system 300 that includes base station 304 and devices/terminals 308 (including devices 308a-308c) may operate in the same frequency channel as the incumbent PtP communication system 200 illustrated in FIG. 2. Although some of the exemplary figures show the base station 304 and PtPR 220 co-located, this is not meant to be limiting and is illustratively provided only as a specific case with other configurations being possible. Unlike the large scale PtP system which are deployed in accordance with a strict FCC regulation and registration processes, for the smaller scale Wi-Fi system to be commercially successful, the deployment process must be much simpler while still guaranteeing non-interference with any existing or future PtP communication systems. What is needed is a self-coordination process that is able to ensure non-interference with any existing (or future) PtP communications. In essence, the PtP communication system (or any other incumbent user of the spectrum) always has the highest priority for any frequency channel in the area in which it has been licensed to operate by the FCC. A Wi-Fi system may register to operate in a specific location using a specific frequency channel after ensuring that it does not interfere with any existing PtP operations. The Wi-Fi system should also ensure that it does not interfere with the operations of any future PtP system which has been licensed by the FCC. Specifically, any future PtP system would have priority over an existing Wi-Fi system, and as such it would be the responsibility of the Wi-Fi system to identify any new PtP systems with which it may interfere. If such a system is detected, the Wi-Fi system should immediately cease operations over that frequency channel.

Figure 4:
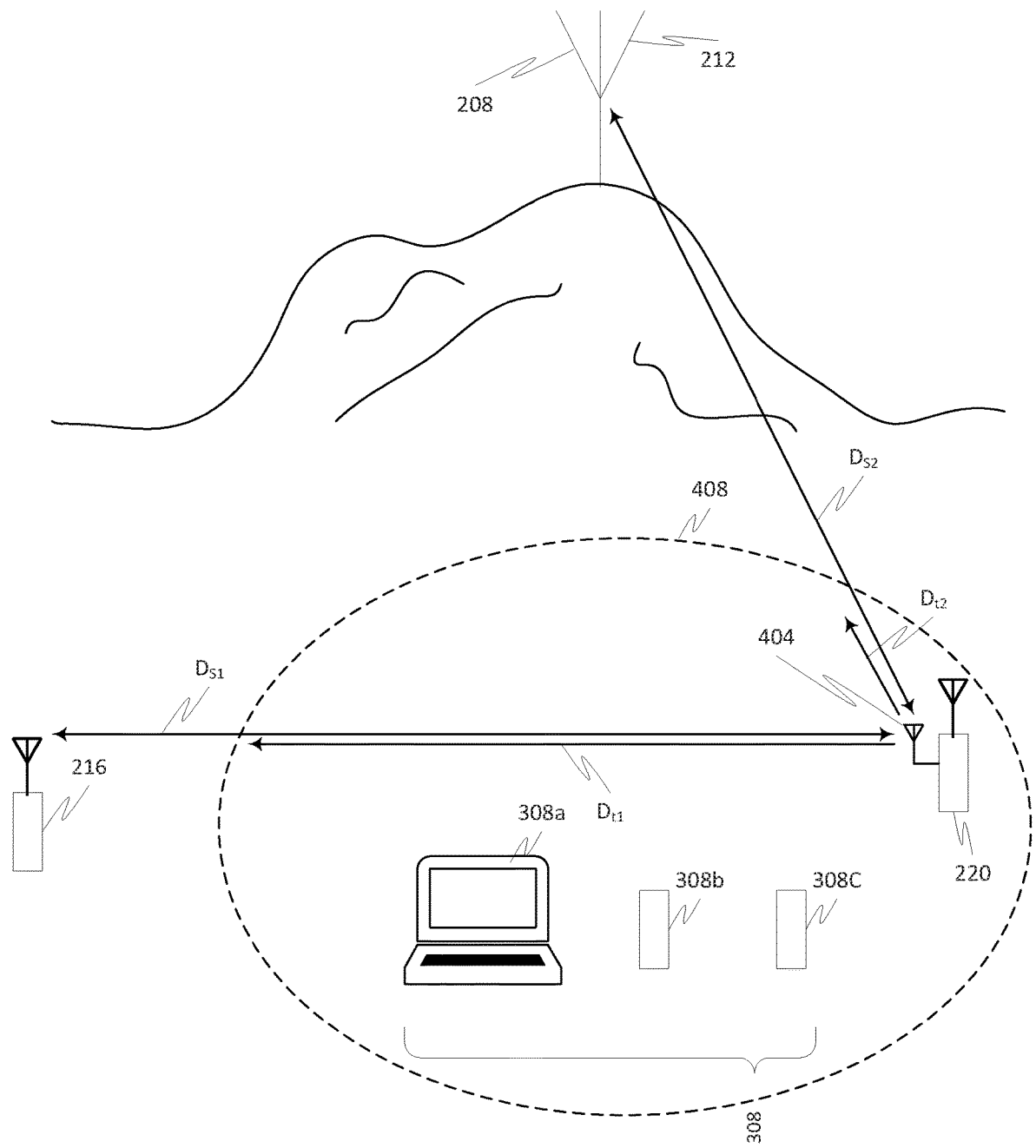
FIG. 4 illustrates an exemplary base station transmitting on the same frequency channel over which the PtP communication system operates in accordance with some embodiments.

FIG. 4 illustrates a first exemplary embodiment where the base station 404 may transmit on the same frequency channel over which the PtP communication system operates. In this exemplary environment, the Wi-Fi system operates in the same geographical environment that the PtP communication system.

FIG. 4 outlines an oval domain 408 that indicates the region in which the transmitted signal from the Wi-Fi base station 404 exceeds a specific power threshold. Those skilled in the art will recognize that the oval shape is provided for illustration only and the actual shape depends on the characteristics of the transmitter, the antenna, as well as the surrounding environment.

To ensure that the transmission from the Wi-Fi base station 404 does not interfere with the operations of the PtP communication system, the Wi-Fi system must ensure that the received signals from its transmission at any PtPR are below a specific threshold level, e.g., 6 dB below thermal noise level. In other words, the Wi-Fi system 404 must ensure that the distance $D_{t1}$ (a distance its transmission power exceeds a predetermined power threshold in a direction towards any PtPR) is smaller than the distance $D_{s1}$ towards that receiver (e.g., $D_{t1}$ must be smaller than $D_{s1}$, and $D_{t2}$ must be smaller than $D_{s2}$ for the environment illustrated in FIG. 4 ($D_{t1}<D_{S1}$ and $D_{t2}<D_{S2}$).

Figure 5:
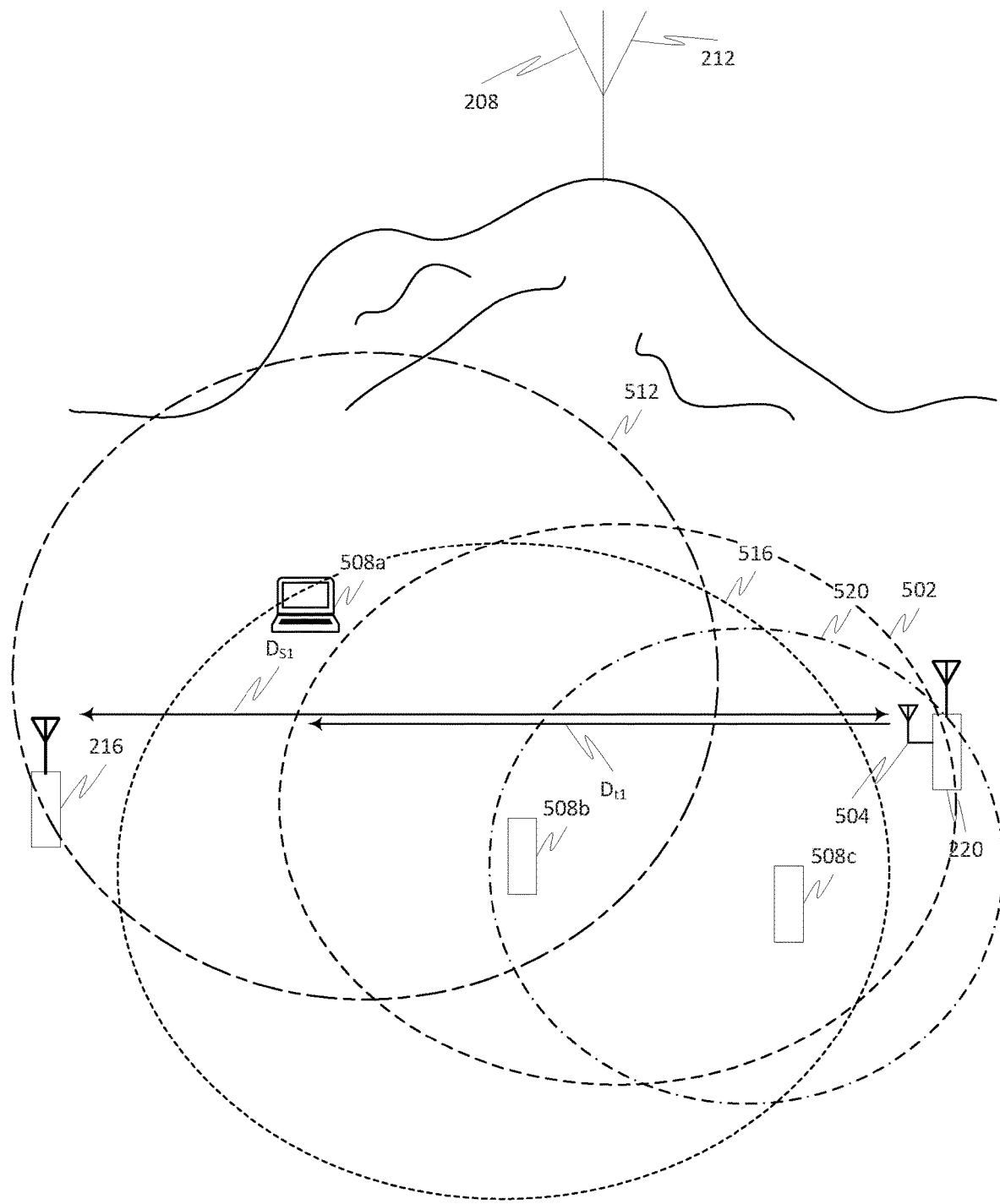
FIG. 5 illustrates an exemplary base station which may or may not transmit on the same frequency channel that the PEP communication system operates in accordance with some embodiments.

FIG. 5 illustrates a second embodiment where the base station 504 may or may not transmit on the same frequency channel that the PtP communication system operates. However, the terminals 508a-508c may operate in the same frequency channel that a PtP communication system operates.

FIG. 5 illustrates an oval domain 502 that indicates the region in which the transmitted signal from the Wi-Fi base station exceeds a specific threshold. Circular domains 512, 516, and 520 indicate the regions in which the transmissions from terminals 508a, 508b, and 508c, respectively, exceed a specific threshold such as the thermal noise level (or 6 dB below thermal noise level). Those skilled in the art will recognize that the oval and circular shapes are provided for illustration only and the actual shape depends on the characteristics of the transmitter, the antenna, as well as the surrounding environment.

To ensure that transmission from the terminals 508a-508c does not interfere with the operations of the PtP communication system, the Wi-Fi system must ensure that the received signals from any of the terminals 508a-508c at any PtPR 216/220 are below a specific threshold, e.g., 6 dB below thermal noise level or other threshold as appropriate.

Referring to FIG. 5, terminals 508b, and 508c are within the lobe 502 of the Wi-Fi station 504, and terminal 508a is outside lobe 502 and thus unable to receive a pilot signal from the Wi-Fi station 504. As such terminals 508b/508c can receive and decode the pilot signal from the Wi-Fi base station 504. Any of these terminals may attempt to communicate via base station 504 and transmit a signal at a predetermined maximum power towards the base station 504. Terminal 508a is too far from base station 504, and as such, terminal 508a may not be able to receive the pilot signal from the base station. As a result, terminal 508a is prohibited from transmitting and attempting to establish communication with base station 504.

Terminal 508b is within reception distance from the base station 504. When terminal 508b transmits at the maximum allowed power, its signal 516 is too weak to arrive at the base station 504 and as such it may not establish communication via base station 504. On the positive side, the signal from terminal 508b which is received at any of the PtPRs 216 or 220, is below the noise threshold and as such it does not interfere with the operations of any of these PtPRs. In general the maximum transmission power of terminals may be limited to ensure that their signal can travel a distance equal or smaller than the maximum distance covered by the base station 504.

Lastly, transmission 520 from terminal 508c arrives at Wi-Fi base station 504 with a power greater than the thermal noise level, and thus may facilitate communication between terminal 508c and the base station 504. The same transmission signal from device 508c arrives at any of the PtPRs with a power lower than a predetermined threshold and as such it does not interfere with the operations of any of these PtP communication systems.

In the first embodiment, the system ensures that a base station that operates in the same frequency/channel as the PtPRs, does not interfere with the operations of the PtP communication system.

In the second embodiment, the system ensures that any terminal that operates in the same frequency/channel as the PtPRs does not interfere with the operations of the PtP communication system.

As explained above, given the fact that PtPRs 216, 220 are passive devices, a Wi-Fi base station cannot use the standard Dynamic Frequency Selection (DFS) algorithm to detect devices that have higher priority for using a specific frequency channel.

Figure 6:
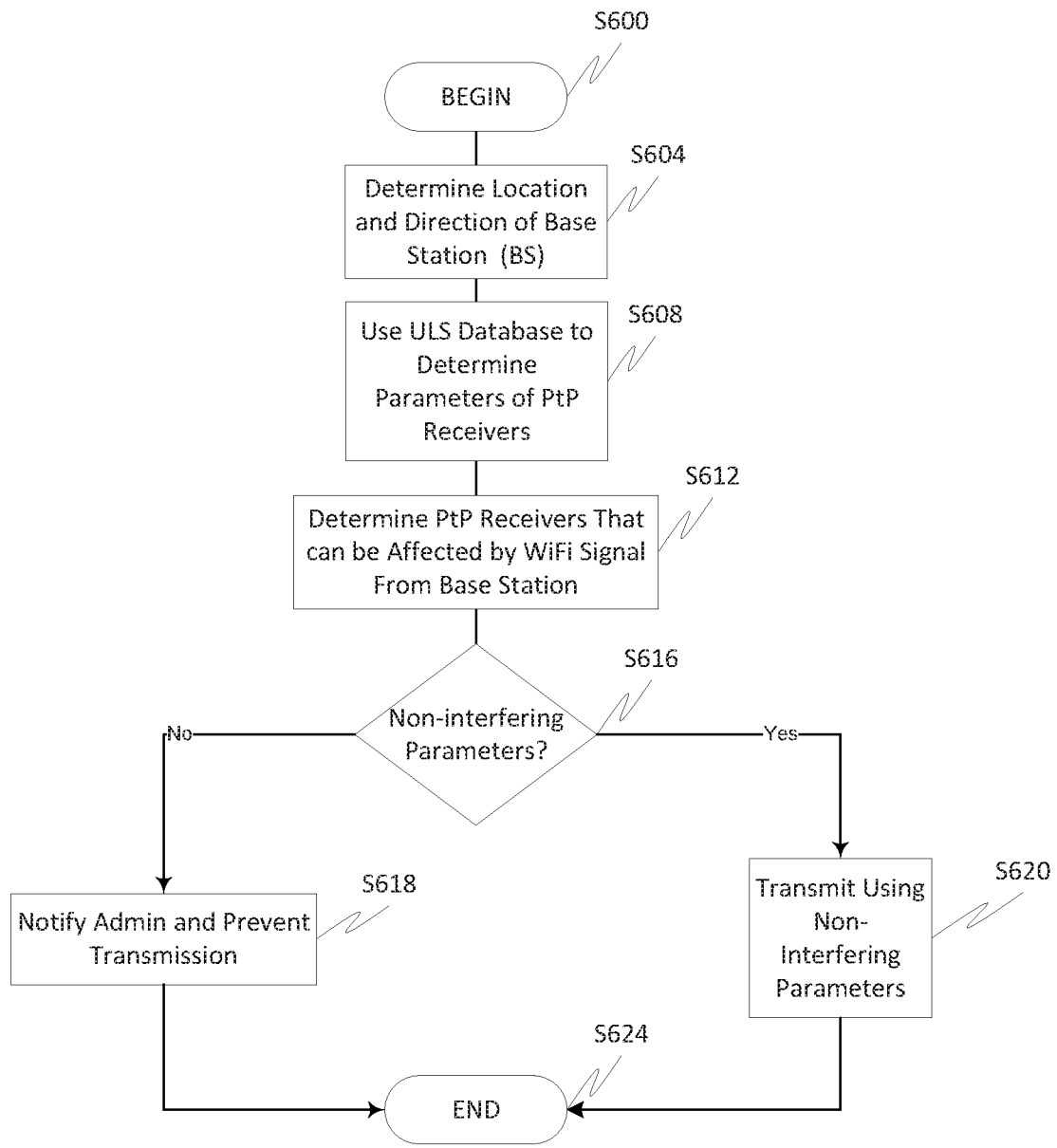
FIG. 6 illustrates an exemplary method for bringing up a Wi-Fi base station which ensures that transmission from a base station does not interfere with any existing PtPRs in accordance with some embodiments.

FIG. 6 describes the process of bringing up a Wi-Fi base station which ensures that transmission from a base station does not interfere with any existing PtPRs. The process starts at step S600 and continues to step S604 where the base station determines its location and the direction its antenna may be pointing. This information may be obtained by GPS readout, triangulation of received signals from known TV stations, configured by an administrator, and/or by any other well-known method.

Next, in step S608, the system accesses the FCC ULS database and retrieves the PtPRs parameters. These parameters may include location, antenna pointing direction, frequency channel(s) used, polarity, as well as any other pertinent parameters for all registered PtPRs. The system then uses these parameters to compute protection zones in a process similar to the one described in the co-pending U.S. patent application Ser. No. 15/379,023 entitled "AVOIDANCE OF INTERFERENCE IN WIRELESS COMMUNICATIONS", filed by Reis et al. on Dec. 14, 2016.

In accordance with the first embodiment, the base station reuses a frequency channel that may be licensed by one of the PtPRs while the terminals use an unlicensed frequency channel. In step S612 the system computes the protection zones based on the parameters of the receivers (which were obtained in step S608), and based on the Wi-Fi based station antenna characteristics, the polarity, as well as the nominal transmission power of the base station.

Figure 7:
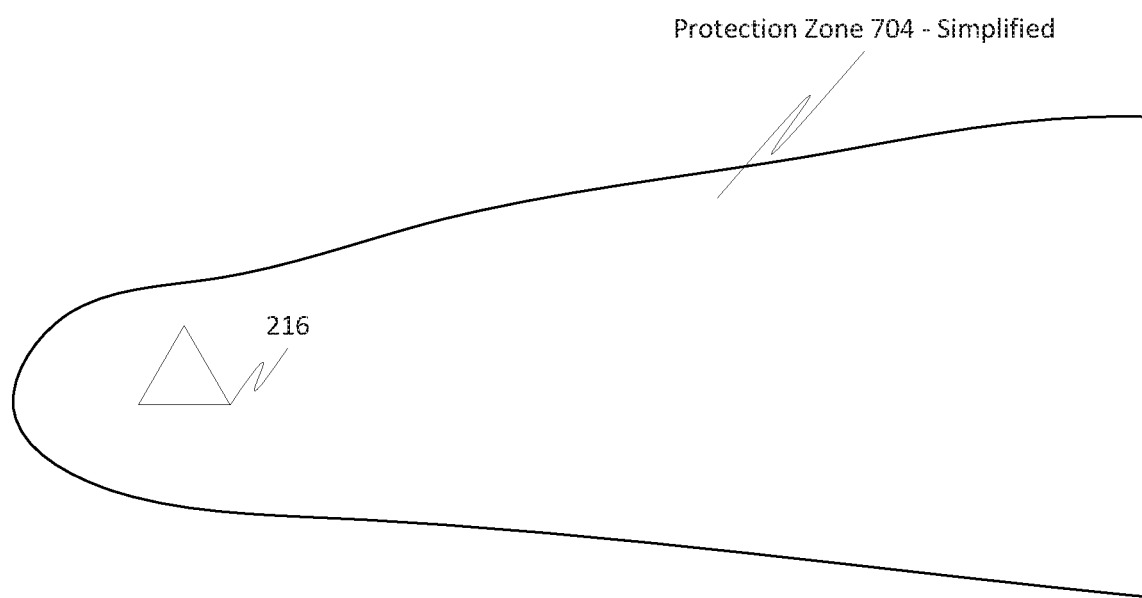
FIG. 7 illustrates an exemplary simplified example of a protection zone in the vicinity of a NPR in accordance with some embodiments.

FIG. 7 illustrates a simplified example of a protection zone 704 in the vicinity of PtPR 216. For each frequency channel in the shared spectrum, the protection zones define the locations from which the base station should not operate so as to avoid interference with the operations of any PtPRs. When a base station operates outside a protection zone it is guaranteed that it can safely use a frequency channel without causing interference to any PtPR.

In accordance with the second embodiment the terminals use a frequency channel that may be licensed by one of the PtPRs. To ensure that the terminal does not interfere with the operations of the PtPRs, the system uses the method described in FIG. 6 to compute the protection zones associated with each PtPR. However, since this time the terminal may interfere with the PtPR and the location of the terminal is not known, the system needs to establish new protection zones.

Figure 8:
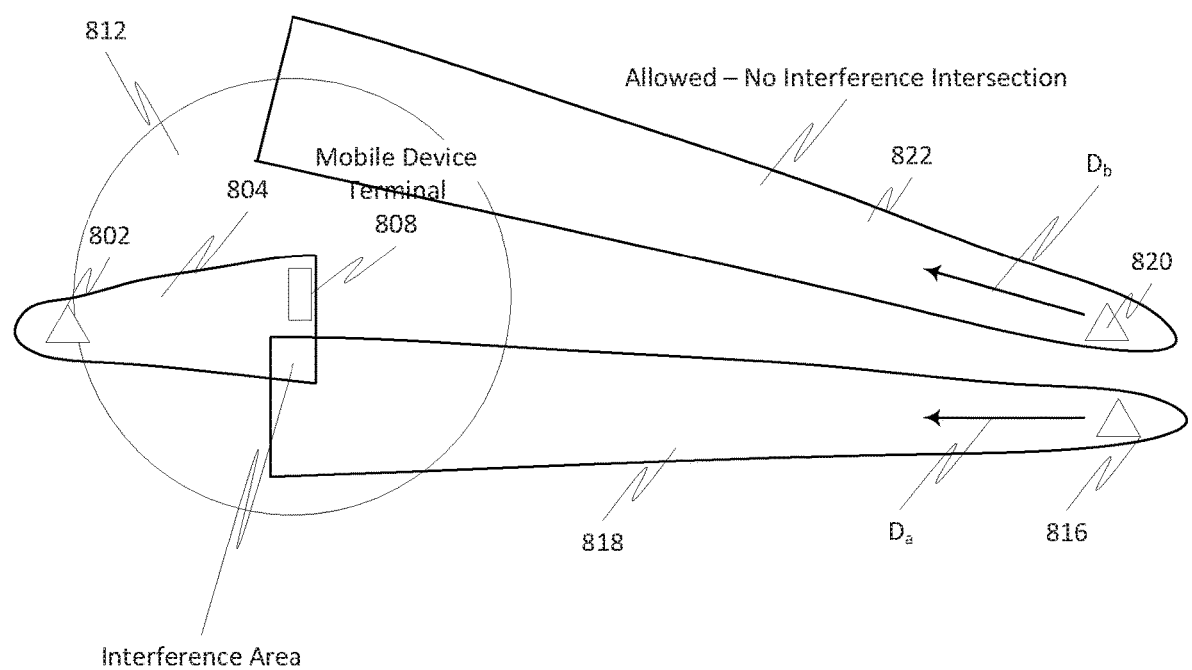
FIG. 8 illustrates exemplary protections zones in accordance with some embodiments.

Referring to FIG. 8, for each PtPR 802 in the illustrative embodiment, the system determines a protection zone 804 such that any terminal/mobile device 808 transmitting (on a specific frequency channel) from outside that zone will not interfere with operations of the PtPR 802. Since the direction in which the terminal 808 may be transmitting is not known, one can assume that the signal from the terminal has the same maximum strength in all directions and covers the region illustrated by the circular shape 812. The protection zone 804 is calculated based on the antenna characteristics of the PtPR 802, the frequency band in which it operates, as well as the maximum power limit that any terminal 808 may use. The system then continues to calculate the transmission coverage zones (such as zones 408, 514, etc.) for the Wi-Fi base station. The transmission coverage zones for the Wi-Fi station are calculated in order to ensure that only terminals 808 which are out of the protection zone 804 may receive sufficient power from the base station and attempt to establish a communication channel with that base station. The system ensures that the signal from the Wi-Fi base station is not received with sufficient power by any terminal within the protection zone 804 and as such ensures that terminals within the protection zone 804 will not attempt to transmit on frequency channels that may interfere with a PtPR 802.

Base station 816 with transmission coverage zone 818 is prevented from transmitting in the direction $D_a$ at nominal power because the base station's signal may be received with sufficient power by terminal 808 which may interfere with PtPR 802. The system may guide the installer to reduce the power of the base station, rotate it in a different direction, move it to a different location, use a different frequency channel, and/or a different signal polarization. For example, base station 820 illustrates a base station which was moved to a different location and was pointed in direction $D_b$ to ensure that any terminal that can establish communication on a specific frequency channel will not interfere with the PtPR 802 resulting in transmission coverage zone 822.

In accordance with at least this exemplary aspect, the protection zone is defined in a broader manner. As can be seen from FIG. 8, a protection zone may be defined not only based on the parameters of the PtPR, but rather the protection zone may depend also on the direction in which the antenna of the base station is pointing and the shape of the antenna lobe. In accordance with this broader definition, the term protection zone can include all the locations of the base station from which the antenna lobe of the base station 818 intersects with the traditional protection zone 804 of an incumbent PtPR. Thus, the term "protection zone" can include either the narrower or the broader definition of a protection zone.

In accordance with yet another non-limiting exemplary embodiment, rather than notifying the administrator or guiding the installer, the system using for example one or more of the processor 1022 and protection zone module 1020 may automatically adapt its parameters to reduce its antenna lobe gain towards the protection zone of any incumbent PtPR while maximizing its coverage in areas outside the protection zones of incumbent PtPRs. The process may include any of the following steps or a combination of these steps: reduce the transmission power, select which antenna segments should be used and at which power per antenna segment, and adapt the parameters of a phased array antenna as to achieve the desired lobe pattern. For example, the base station may have 8 antenna segments with each segment having a lobe spanning 45 degrees. The base station may be positioned such as to align some its 8 lobes towards incumbent PtPRs and reducing the transmission power on these lobes as to prevent interference with the PtPRs.

The computation of these protection zones may incorporate urban plans which include the location and size of buildings as well as other topographical information. The computation may be performed by the base station, or alternatively, the computation may be performed by another server or cloud based computer resources and then communicated to the base station via a computer network such as the one described in FIG. 1.

Returning to FIG. 6, in step S612 the system attempts to determine base station parameters that will ensure non-interference by either the base station or the terminals. These parameters could include but are not limited to transmission power, antenna sectors or parameters to be used, parameters of a phased array antenna, etc. In step S616 the system checks if such parameters have been found. If such parameters were found, the system continues to step S620 where the parameters which ensure non-interference are used for transmission by the base station. However, if such parameters are not found, or if the power that the base station could use falls below a specific threshold, the system continues to step S618 where the system may generate an entry in an error log and/or it may notify an administrator advising him to relocate the base station to a different location or to point it in a different direction. Control then continues to step S624 where the sequence ends.

Figure 9:
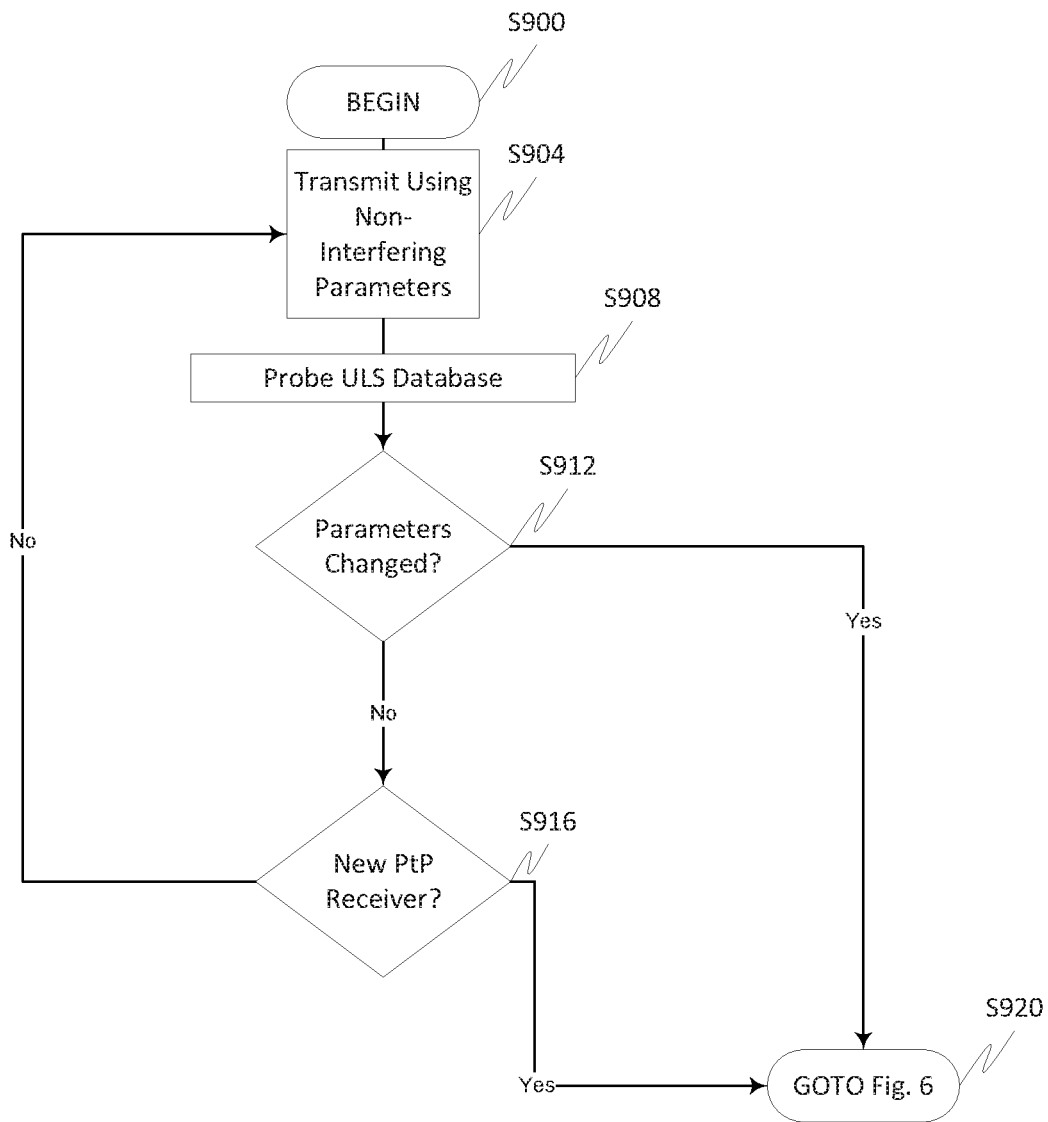
FIG. 9 illustrates a method for the exemplary operation of the system in accordance with some embodiments.

FIG. 9 illustrates a method for continued operation of the system. Control begins in step S900 and continues to step S904 where base station transmits a signal using parameters determined to ensure that the base station and/or the terminals do not interfere with operations of any PtPR. Next, in step S908 the system periodically probes (e.g., every day, every week, every hour, or in general at any time frequency) the FCC ULS database. The system then checks in step S912 whether any of the parameters of the existing PtPRs have changed. Examples of parameter changes for a specific PtPR may include but are not limited to adding a new frequency channel, adding polarization to a specific frequency channel, changing antenna characteristics or the like.

Then, if the system determines in step S912 that a change in parameters has occurred, the system continues to step S920 wherein control jumps to step S600 in FIG. 6 to determine if the change affects the operating parameters of the base station.

If the information for the PtPRs remained unchanged, control continues to step 916 where the system determines if any new PtPR has been established. If the system determines that a new PtPR is in operation, the system continues to step S920 wherein again control jumps to step S600 to determine if the change affects the operating parameters of the base station. However, if the system determines that no new PtPRs have been brought online, control loops back to step S904.

The process of probing the ULS database of step S908, can be performed by the base station itself or alternatively can be performed by a network attached server or the like. The network attached server then notifies each one of the associated base station(s) whether the base station needs to update its operations parameters. To continue operating, a base station may need to ensure that its parameter data has been updated (or validated) at least periodically, e.g., daily, weekly, etc. If the update/validation is not received within a predetermined timeframe, the base station must cease its transmission and request updated/validated parameters.

FIG. 10 illustrates an exemplary base station 1000. The base station 1000 includes one or more antennas 1004 associated with the Wi-Fi signal transceiver 1016. The antenna could be, as just some examples, an omni-directional simple antenna, directional antenna, a multi-section antenna capable of selectively transmitting in different directions, or a phased array antenna capable of changing its lobe based on one or more specific operational parameters. The base station 1000 further includes a protection zone module 1020, a processor/CPU/ASIC 1022, a LAN/WAN Controller 1008, communications modules 1012, a Wi-Fi Transceiver 1016, a location & direction determination module 1032, memory 1024, a power supply 1028, all interconnected by links/bus 5.

The base station 1000 is capable of being in communication with one or more computing servers/cloud computing services 1044 via conventional LAN/WAN network 1036 such as that illustrated in FIG. 1. The base station may communicate directly with FCC ULS database 1040 and obtain parameters of PtPRs. Alternatively, or in addition, all or a portion of the data from the ULS database could be stored or collocated in the memory 1024. Alternatively, step S608 and step S908 may be executed by external processing services in the cloud 1044 and the raw or processed information may be conveyed to base station 1000. Some specific non-limiting examples of processed information may include a transmission power limit, which specific antenna segments may be used, phased array antenna parameters, and the like.

While operation will be discussed in relation to the components in FIG. 10 appreciating that each separate device in a system, e.g., terminal, processing services, LAN/WAN, etc., can include one or more of the components shown in the figure, with each of the components being optional and each capable of being collocated on a single device or non-collocated and distributed over a plurality of devices. Each of the components in FIG. 10 can optionally be merged with one or more of the other components described herein, or into a new component(s). Additionally, it is to be appreciated that some of the components may have partially overlapping functionality. Similarly, all or a portion of the functionality of a component can optionally be merged with one or more of the other components described herein, or into a new component(s).

The one or more antennas 1004 can be used for wireless communications over one or more wireless links between a base station and a terminal. Furthermore those skilled in the art will recognize that the LAN/WAN communication link to the network 1036 and other devices may be based on wired or wireless links. The wireless communication can be in accordance with technologies such as LPWAN, multi-input multi-output (MIMO) communications, multi-user multi-input multi-output (MU-MIMO) communications, Bluetooth®, LTE, RFID, 4G, 5G, LTE, LWA, LP communications, Wi-Fi, satellite communication, etc. In general, the antenna(s) 1004 discussed herein can include, but are not limited to one or more of directional antennas, omnidirectional antennas, monopoles, patch antennas, loop antennas, microstrip antennas, dipoles, multi-element antennas, phased array, and any other antenna(s) suitable for communication transmission/reception. In an exemplary embodiment, transmission/reception may require a particular antenna spacing or placement on a device. In another exemplary embodiment, the type of transmission/reception can require spatial diversity allowing for different channel characteristics at each of the antennas. In accordance with yet another exemplary embodiment, the antenna is a phased array antenna whose lobe pattern can be governed by configuring its operational parameters. In accordance with this embodiment, the system calculates parameters that shape the lobe of the antenna so as to minimize the gain of the antenna in the direction(s) of the incumbent PtPRs while maximizing the gain of the antenna in all other directions. In one specific exemplary case, the base station may be deployed to provide Wi-Fi coverage to a specific area. In this case, the parameters of the phased array antenna may be calculated so as to minimize the gain of the antenna in the direction of the incumbent PtPRs while maximizing the gain in the direction of the area in which the system is designated to provide Wi-Fi coverage.

For example, wireless links, therefore, may specifically include communication over licensed and unlicensed frequency channels.

The antenna(s) 1004 generally interact with an Analog Front End (AFE) (not shown) and other communications subsystems 1012, which is used to enable the correct processing of the received modulated signal and signal conditioning for a transmitted signal. The AFE can be functionally located between the antenna and a digital baseband system (not shown) in order to convert the analog signal into a digital signal for processing and vice-versa.

The CPU/controller/microprocessor/ASIC 1022 can be connected to the memory/storage/cache 1024 and one or more of the other components discussed herein. The various components can interact with the memory/storage 1024 and processor 1022 which may store information and operations necessary for configuring and transmitting or receiving the information described herein and/or operating the device as described. The memory/storage 1024 may also be used in connection with the execution of application programming or instructions by the controller/CPU/ASIC 1022, and for temporary or long term storage of program instructions and/or data. As examples, the memory/storage 1024 may comprise a computer-readable device, RAM, ROM, DRAM, SDRAM, HD, and/or other storage device(s) and media.

The processor 1022 may comprise a general purpose programmable processor or controller for executing application programming or instructions related to the device 1000. Furthermore, the processor 1022 can perform operations for configuring and transmitting information as described herein. The processor 1022 may include multiple processor cores, and/or implement multiple virtual processors. Optionally, the processor 1022 may include multiple physical processors. By way of example, the processor 1022 may comprise one or more of a specially configured Application Specific Integrated Circuit (ASIC) or other integrated circuit, a digital signal processor(s), a controller, a hardwired electronic or logic circuit(s), a programmable logic device or gate array, a special purpose computer, and/or the like, to perform the functionality described herein.

The base station 1000 can further include a transmitter(s) radio circuit and receiver(s) radio circuit which can transmit and receive signals, respectively, to and from other wireless devices and/or satellites using the one or more antennas. Optionally included in the device 1000 is a medium access control or MAC module/circuitry and PHY circuitry.

The MAC module can provide control for accessing the wireless medium between devices. In an exemplary embodiment, the MAC circuitry may be arranged to contend for the wireless medium and configure frames or packets for communicating over the wireless medium as discussed.

The PHY module controls the electrical and physical specifications for communication. In particular, PHY module manages the relationship between the devices and the transmission medium. Primary functions and services performed by the physical layer, and in particular the PHY module, include the establishment and termination of a connection to a communication medium, and participation in the various processes and technologies where communication resources are shared between, for example, multiple devices. These technologies further include, for example, contention resolution and flow control and modulation/demodulation or conversion between a representation of digital data and the corresponding signals transmitted over the communication channels. These signals are transmitted over a radio communication (wireless) link. The physical layer of the OSI model and the PHY module/circuitry can be embodied as a plurality of sub-components. These sub-components and/or circuits can include a Physical Layer Convergence Procedure (PLCP) which can act as an adaptation layer. The PLCP is at least responsible for the Clear Channel Assessment (CCA) and building packets for different physical layer technologies. The Physical Medium Dependent (PMD) layer specifies modulation and coding techniques used by the device and a PHY management layer manages channel tuning and the like. A station management sub-layer and the MAC circuitry can also handle coordination of interactions between the MAC and PHY layers at the various transceivers.

The MAC layer and components, and in particular the MAC circuitry can provide a functional and procedural means to transfer data between entities and to detect and possibly correct errors that may occur in the physical layer. The MAC circuitry also can provide access to contention-based and contention-free traffic on different types of physical layers, such as when multiple communication technologies are incorporated into one or more of the devices. In the MAC, the responsibilities are divided into the MAC sub-layer and the MAC management sub-layer. The MAC sub-layer defines access mechanisms and packet formats while the MAC management sub-layer defines power management, security and roaming services, etc.

The base station 1000 can also optionally contain a security module (not shown). This security module can contain information regarding but not limited to, security parameters required to connect the terminal to one or more other devices or other available network(s), and can include WEP or WPA/WPA-2 (optionally+AES and/or TKIP) security access keys, network keys, etc. Security access keys are a security password used by networks. Knowledge of this code can enable a wireless device to exchange information with another device.

The base station 1000 can also optionally contain an interleaver/deinterleaver that can perform interleaving and/or deinterleaving functions to, for example, assist with error correction. A modulator/demodulator can optionally perform modulation and/or demodulation functions such as OFDM, QPSK, QAM, or other modulation/demodulaton techniques, etc. An encoder/decoder can optionally perform various types of encoding/decoding of data. A scrambler can optionally be used for data encoding. A multiplexer/demultiplexer can optionally provide multiplexing and demultiplexing services, such as spatial multiplexing.

In operation, the location and direction determination module 1032 may obtain the location of the base station and the direction in which the antenna(s) 1004 points either from an internal GPS and compass which can optionally be part of the module 1032, and/or alternatively from a configuration terminal (not shown) which can be connected to the base station 1000 by a wired or wireless communication link.

Alternatively, a configuration terminal may be connected to the base station via the LAN network 1036. The CPU 1022 and memory 1024 along with the protection zone module 1020 calculates the protection zones associated with each PtPR for each specific frequency channel and polarization. As described above, the computation can be executed by the protection zone module 1020 or in collaboration with external computation services such as an external server or cloud computing service 1044. The method for computing the protection zone depends upon whether the terminal transmits over a licensed frequency band or over an unlicensed frequency band. If the protection zone module 1020 (either by itself on in collaboration with external computation services 1044) finds operation parameters that will ensure non-interference with any PtPR, the CPU 1022 sets the operating parameters in memory 1024 to these parameters and controls the Wi-Fi transceiver 1016 to operate using the parameters. In one specific exemplary embodiment, the parameters may include the operational parameters of a phased array antenna so as to minimize the gain in a direction towards all PtPRs and maximize the gain towards areas in which the base station is to provide Wi-Fi coverage. Otherwise, if such parameters cannot be found, the CPU 1022 logs an error message and may notify the administrator to change the location or other operating parameters such as, but not limited to, the direction in which the antenna(s) 1004 points.

Given the popularity of wireless communications modality the current bandwidth is getting crowded and communication companies are looking for new bandwidth that could be utilized for communication. One of the bandwidth expansions that are entertained is the frequency range between 5.9 GHz to 7.0 GHz which overlaps with C-band communication systems. (C-Band is defined as frequency band ranging from 4.0 to 8.0 gigahertz (GHz)). More specifically, incumbent point to point receivers (PtPR) may operate in this range.

As mentioned, avoiding interference with military and weather radar systems is rather simple as these systems announce their presence by transmitting a periodic radio signal as part of their normal operation. In contrast the PtPRs are passive systems which may be tuned to receive signals from transmitters with narrow-lobe antenna that points in their direction.

If Wi-Fi and especially outdoor Wi-Fi are to utilize the frequency range between 5.9 Ghz to 7 Ghz, the system must ensure that both the Wi-Fi hotspot or base station and the associated Wi-Fi devices/terminals do not interfere with the operations of any incumbent PtPRs. The challenge is to ensure that a new Wi-Fi system does not interfere with the incumbent receiver even though the receivers are passive devices which do not announce their presence.

Another challenge stems from the fact that the PtPR environment is dynamic and the PtPR based communications equipment has priority over other systems (such as a Wi-Fi system). Specifically, operators of an incumbent communication system may request and license (from the FCC) a new frequency channel. As such, a Wi-Fi system that operated without interfering with any PtPR may start interfering with a newly assigned frequency to a PtPR.

Exemplary aspects described herein also address these needs by allowing deployment safely without interfering with any existing incumbent PtPR. Additionally, the system is capable of being updated in a timely manner about any frequency bands that neighboring PtPRs license from the FCC. If the Wi-Fi system detects that a neighboring PtPR licensed a specific frequency band, the system can immediately stop using that frequency as to ensure that the operations of the PtPR are not interfered with.

Although the disclosure has been described in reference to PtPRs, it is to be appreciated that the technology disclosed herein is applicable to any incumbent receiver(s) in any frequency(ies) of which the Point to Point Receivers are only one example It should be noted that certain steps within the flowcharts may be optional and the steps shown in the figures are merely examples for illustration, and certain other steps may be included or excluded as desired. Furthermore, while a particular order of the steps is shown, this ordering is merely illustrative, and any suitable arrangement of the steps may be utilized without departing from the scope of the embodiments herein. Moreover, the methods are described separately, certain steps from each procedure may be incorporated into one or more of the other methods, and the various steps are not meant to be mutually exclusive.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology —Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems— Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing or future developed cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols or other communications protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), LPWAN, LoRA, Ultra Narrow Band, Random Phase Multiple Access, or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, the technology may be useful in the unlicensed spectrum.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It is to also be understood that usage of the terms terminal, device, IoT device, sensor, and the like, can optionally all be equivalent and describe the same function while at times in a different context or using different hardware.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or satellite communications system(s) described herein.

Thus, it should be appreciated that the components of the system can be combined into one or more devices, or split between devices, such as a transceiver, a device, an IoT sensor, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a spatial router, a node on the network, a domain management device, a network operation or management device, a transceiver(s), a station, an access point(s), a communications unit, or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to LPWAN communications. However, it should be appreciated, that in general, portions of the systems and methods herein will work equally well for any type of communication system in any environment utilizing any one or more protocols including wired communications, wireless communications, powerline communications, coaxial cable communications, fiber optic communications, and the like.

To avoid unnecessarily obscuring the present disclosure, the description omits well-known structures and devices that may be shown in block diagram form or otherwise summarized.

Exemplary aspects are directed toward:

A communications system comprising:
a first wireless communication network that determines a protection zone for each of a plurality of unintended receivers of a second wireless communication network, wherein a protection zone defines a geographical area where transmission by at least one of a base station and terminal may cause interference with operation of a corresponding at least one unintended receiver;
the first wireless communication network using a location and direction determination module to determine a current location of the base station;
the first wireless communication network determining a current direction in which the antenna of the base station points;
the first communication network determining whether the current location and antenna direction of the base station is within any protection zone of the plurality of unintended receivers and may cause interference with the operation of a corresponding unintended receiver; and
a protection zone system that determines whether transmission is allowed.

Any one or more of the above aspects, wherein a transceiver in the base station transmits in response to the current location and antenna direction not being within any protection zone of the plurality of unintended receivers.

Any one or more of the above aspects, wherein the base station performs a local assessment of interference to one or more unintended receivers in response the current location or antenna direction being new or modified, or the information from the ULS (Universal Licensing System) database being new or modified.

Any one or more of the above aspects, wherein the base station performs a transmission in response to a local assessment of interference concluding that there will be no interference with any of the one or more unintended receivers.

Any one or more of the above aspects, wherein the base station is prevented from transmitting in response to a local assessment of interference concluding that there will be interference with any of the one or more unintended receivers.

Any one or more of the above aspects, wherein the interference may be caused by transmission from the base station of the first wireless communication network to a receiver of the second wireless communication network.

Any one or more of the above aspects, wherein the interference is caused by transmission from a terminal of the first wireless communication network to a receiver of the second wireless communication network.

Any one or more of the above aspects, wherein preventing the transmission by the base station includes one or more of logging an error message, notifying a system administrator, and/or suggesting different operational parameters for the base station.

Any one or more of the above aspects, wherein the determining, by the first communication system, whether the current location and antenna direction of the base station is within any protection zone includes testing optional operating parameters for the base station and selecting a set of operational parameters that ensures that the base station does not transmit from within a protection zone of any point to point receiver.

Any one or more of the above aspects, wherein being within a protection zone of one or more of the plurality of unintended receivers includes determining that an only way to not interfere with one or more point to point receivers includes reducing the transmission power of the base station below a predetermined threshold.

Any one or more of the above aspects, wherein the determining by the first communication system includes one or more of performing calculations in an internal CPU of the base station, performing calculations in a server or cloud computing resource associated with the base station via a computer network and controlling operations of the base station by external computation services, and jointly performing the determination by a CPU of the base station and the external computation services.

A method of operating a communications system comprising:

determining, in a first wireless communication network, a protection zone for each of a plurality of unintended receivers of a second wireless communication network, wherein a protection zone defines a geographical area where transmission by a base station may cause interference by at least one of a base station and terminal with operation of a corresponding at least one unintended receiver;

determining, in the first wireless communication network, a current location of the base station;

determining, in the first wireless communication network, a current direction in which the antenna of the base station points;

determining, in the first communication network, whether the current location and antenna direction of the base station is within any protection zone of the plurality of unintended receivers and may cause interference with the operation of a corresponding unintended receiver;

a protection zone system that determines whether transmission is allowed.

Any one or more of the above aspects, further comprising the base station transmitting in response to the current location and antenna direction not being within any protection zone of the plurality of unintended receivers.

Any one or more of the above aspects, wherein the base station performs a local assessment of interference to one or more unintended receivers in response the current location or antenna direction being new or modified, or the information from the ULS (Universal Licensing System) database being new or modified.

Any one or more of the above aspects, wherein the base station performs a transmission in response to a local assessment of interference concluding that there will be no interference with any of the one or more unintended receivers.

Any one or more of the above aspects, wherein the base station is prevented from transmitting in response to a local assessment of interference concluding that there will be interference with any of the one or more unintended receivers.

Any one or more of the above aspects, wherein the interference may be caused by transmission from the base station of the first wireless communication network to a receiver of the second wireless communication network.

Any one or more of the above aspects, wherein the interference is caused by transmission from a terminal of the first wireless communication network to a receiver of the second wireless communication network.

Any one or more of the above aspects, wherein preventing the transmission by the base station includes one or more of logging an error message, notifying a system administrator, and/or suggesting different operational parameters for the base station.

Any one or more of the above aspects, wherein the determining, by the first communication system, whether the current location and antenna direction of the base station is within any protection zone includes testing optional operating parameters for the base station and selecting a set of operational parameters that ensures that the base station does not transmit from within a protection zone of any point to point receiver.

Any one or more of the above aspects, wherein being within a protection zone of one or more of the plurality of unintended receivers includes determining that an only way to not interfere with one or more point to point receivers includes reducing the transmission power of the base station below a predetermined threshold.

Any one or more of the above aspects, wherein the determining by the first communication system includes one or more of performing calculations in an internal CPU of the base station, performing calculations in a server or cloud computing resource associated with the base station via a computer network and controlling operations of the base station by external computation services, and jointly performing the determination by a CPU of the base station and the external computation services.

A communications device comprising:

a location and direction determination module to determine a current location of a base station and a current direction in which the antenna of the base station points;

a protection zone module to determine whether the current location and antenna direction of the base station is within any protection zone of a plurality of unintended receivers and may therefore cause interference with an operation of a corresponding unintended receiver, wherein a protection zone defines a geographical area where transmission by at least one of the base station and a terminal may cause interference with operation of a corresponding at least one unintended receiver, the protection zone module further preventing transmission by the base station when the current location and antenna direction of the base station is within any protection zone of one or more of the plurality of unintended receivers.

A method to operate a communications device comprising:

determining a current location of a base station and a current direction in which the antenna of the base station points;

determining whether the current location and antenna direction of the base station is within any protection zone of a plurality of unintended receivers and may therefore cause interference with an operation of a corresponding unintended receiver, wherein a protection zone defines a geographical area where transmission by at least one of the base station and a terminal may cause interference with operation of a corresponding at least one unintended receiver; and preventing transmission by the base station when the current location and antenna direction of the base station is within any protection zone of one or more of the plurality of unintended receivers.

A system for periodically distributing information to each connected device comprising:

a processor and connected memory that determine from information acceptable communication channels, polarization, antenna segments, and power levels;

a processor and connected memory allowing transmission by a communications device when an acceptable combination of communication channels, polarization, antenna parameters, and power levels exist, and preventing transmission when it is determined that an acceptable combination of communication channels, polarization, antenna parameters, and power levels do not exist;

wherein the combination of communication channels, polarization, antenna parameters, and power levels is acceptable when transmission by a base station does not cause interference by the base station or by an associated terminal with the operations of a PtPR.

Any one or more of the above aspects, wherein the information is at least from a look-up table containing information about the PtPRs, and the base station determines if the base station has acceptable communication parameters including one or more of frequency channels, polarization, antenna parameters, and power levels before the base station transmits.

Any one or more of the above aspects, wherein the information is obtained from an external computing device; and transmission by the device is allowed when acceptable communication parameters can be calculated based on information obtained within a predetermined period of time; or transmission by the device is prevented when acceptable communication parameters cannot be calculated based on information obtained within a predetermined period of time or when the only available information was obtained prior a predetermined period of time.

Any one or more of the above aspects, wherein the external computing device is one or more of a network attached server and/or a cloud based services.

Any one or more of the above aspects, wherein the information includes communication parameters including one or more of transmission power, antenna segment to be used, operational parameters for a phased array antenna, frequency channel, and polarization.

Any one or more of the above aspects, wherein the information is obtained from an external computing device; and transmission by the device is allowed when the deice identifies acceptable communication parameters within a predetermined period of time; or transmission by the device is prevented when the device does not identify acceptable communication parameters within a predetermined period of time or when the only available information was obtained prior a predetermined period of time.

Any one or more of the above aspects, wherein the device is a WiFi base station.

Any one or more of the above aspects, wherein the information is distributed by either one of periodic broadcast message, periodic unsolicited direct message to the device, or in response to a request from the device for the information.

Any one or more of the above aspects, wherein the device ceases transmission when it is determined that stored information is out of date.

Any one or more of the above aspects, further comprising the processor determining whether a current location and antenna direction of the base station is within any protection zone of a plurality of unintended receivers and may cause interference with the operation of a corresponding unintended receiver and further includes periodically checking a database for one or more of changes in operational parameters of existing point to point receivers or establishment of a new point to point receiver.

Any one or more of the above aspects, wherein the system automatically adapt communication parameters to reduce an antenna lobe gain towards a protection zone of any incumbent PtPR while maximizing coverage in areas outside the protection zone of incumbent PtPRs.

A method to periodically distribute information to each connected device comprising:

a processor and connected memory that determine from information acceptable communication channels, polarization, antenna segments, and power levels;

a processor and connected memory allowing transmission by a communications device when an acceptable combination of communication channels, polarization, antenna parameters, and power levels exist, and preventing transmission when it is determined that an acceptable combination of communication channels, polarization, antenna parameters, and power levels do not exist;

wherein the combination of communication channels, polarization, antenna parameters, and power levels is acceptable when transmission by a base station does not cause interference by the base station or by an associated terminal with the operations of a PtPR.

Any one or more of the above aspects, wherein the information is at least from a look-up table containing information about the PtPRs, and the base station determines if the base station has acceptable communication parameters including one or more of frequency channels, polarization, antenna parameters, and power levels before the base station transmits.

Any one or more of the above aspects, wherein the information is obtained from an external computing device; and transmission by the device is allowed when acceptable communication parameters can be calculated based on information obtained within a predetermined period of time; or transmission by the device is prevented when acceptable communication parameters cannot be calculated based on information obtained within a predetermined period of time or when the only available information was obtained prior a predetermined period of time.

Any one or more of the above aspects, wherein the external computing device is one or more of a network attached server and/or a cloud based services.

Any one or more of the above aspects, wherein the information includes communication parameters including one or more of transmission power, antenna segment to be used, operational parameters for a phased array antenna, frequency channel, and polarization.

Any one or more of the above aspects, wherein the information is obtained from an external computing device; and transmission by the device is allowed when the deice identifies acceptable communication parameters within a predetermined period of time; or transmission by the device is prevented when the device does not identify acceptable communication parameters within a predetermined period of time or when the only available information was obtained prior to a predetermined period of time.

Any one or more of the above aspects, wherein the device is a WiFi base station.

Any one or more of the above aspects, wherein the information is distributed by either one of periodic broadcast message, periodic unsolicited direct message to the device, or in response to a request from the device for the information.

Any one or more of the above aspects, wherein the device ceases transmission when it is determined that stored information is out of date.

Any one or more of the above aspects, further comprising determining whether a current location and antenna direction of the base station is within any protection zone of a plurality of unintended receivers and may cause interference with the operation of a corresponding unintended receiver and further includes periodically checking a database for one or more of changes in operational parameters of existing point to point receivers or establishment of a new point to point receiver.

Any one or more of the above aspects, wherein the system automatically adapt communication parameters to reduce an antenna lobe gain towards a protection zone of any incumbent PtPR while maximizing coverage in areas outside the protection zone of incumbent PtPRs.

A non-transitory computer readable information storage media having stored thereon instructions that when executed by one or more processors cause to be performed any one or more of the above aspects.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as a spatial router, or collocated on a particular node/element(s) of a distributed network, such as a communications network. As will be appreciated from the following description, and for reasons of computational efficiency, the components of the system can be arranged at any location within a distributed network without affecting the operation of the system. For example, the various components can be located in a transceiver, a spatial router, a station, a sensor, a management device, or some combination thereof. Similarly, one or more functional portions of the system could be distributed between a transceiver and an associated computing device.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for communication. Additionally, the exemplary techniques illustrated herein are not limited to the specifically illustrated embodiments but can also be utilized with the other exemplary embodiments and each described feature is individually and separately claimable.

The above-described system can be implemented or partially implemented on a wireless telecommunications device(s)/system, such an IEEE 802.11 transceiver, a satellite communications transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, 3GPP, Wireless LAN, WiMAX, DensiFi SIG, Unifi SIG, 3GPP LAA (licensed-assisted access), and the like.

The term transceiver/terminal as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm®

Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications technology. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A communications system comprising:
   a first wireless communication network that determines a protection zone for each of a plurality of unintended receivers of a second wireless communication network, wherein a protection zone defines a geographical area where transmission by at least one of a base station and terminal may cause interference with operation of a corresponding at least one unintended receiver;
   the first wireless communication network using a location and direction determination module to determine a current location of the base station;
   the first wireless communication network determining a current direction in which the antenna of the base station points;
   the first communication network determining whether the current location and antenna direction of the base station is within any protection zone of the plurality of unintended receivers and may cause interference with the operation of a corresponding unintended receiver; and
   a protection zone system that determines whether transmission is allowed.

2. The communications system of claim 1, wherein a transceiver in the base station transmits in response to the current location and antenna direction not being within any protection zone of the plurality of unintended receivers.

3. The communications system of claim 1, wherein the base station performs a local assessment of interference to one or more unintended receivers in response the current location or antenna direction being new or modified, or the information from the ULS (Universal Licensing System) database being new or modified.

4. The communications system of claim 1, wherein the base station performs a transmission in response to a local assessment of interference concluding that there will be no interference with any of the one or more unintended receivers.

5. The communications system of claim 1, wherein the base station is prevented from transmitting in response to a local assessment of interference concluding that there will be interference with any of the one or more unintended receivers.

6. The communications system of claim 1, wherein the interference may be caused by transmission from the base station of the first wireless communication network to a receiver of the second wireless communication network.

7. The communications system of claim 1, wherein the interference is caused by transmission from a terminal of the first wireless communication network to a receiver of the second wireless communication network.

8. The communications system of claim 5, wherein preventing the transmission by the base station includes one or more of logging an error message, notifying a system administrator, and/or suggesting different operational parameters for the base station.

9. The communications system of claim 1, wherein the determining, by the first communication system, whether the current location and antenna direction of the base station is within any protection zone includes testing optional operating parameters for the base station and selecting a set of operational parameters that ensures that the base station does not transmit from within a protection zone of any point to point receiver.

10. The communications system of claim 1, wherein being within a protection zone of one or more of the plurality of unintended receivers includes determining that an only way to not interfere with one or more point to point receivers includes reducing the transmission power of the base station below a predetermined threshold.

11. The communications system of claim 1, wherein the determining by the first communication system includes one or more of performing calculations in an internal CPU of the base station, performing calculations in a server or cloud computing resource associated with the base station via a computer network and controlling operations of the base station by external computation services, and jointly performing the determination by a CPU of the base station and the external computation services.

12. A communications device comprising:
a location and direction determination module to determine a current location of a base station and a current direction in which the antenna of the base station points;
a protection zone module to determine whether the current location and antenna direction of the base station is within any protection zone of a plurality of unintended receivers and may therefore cause interference with an operation of a corresponding unintended receiver, wherein a protection zone defines a geographical area where transmission by at least one of the base station and a terminal may cause interference with operation of a corresponding at least one unintended receiver, the protection zone module further preventing transmission by the base station when the current location and antenna direction of the base station is within any protection zone of one or more of the plurality of unintended receivers.

* * * * *